(12) United States Patent
Johnson (10) Patent No.: US 11,632,910 B1
(45) Date of Patent: Apr. 25, 2023

(54) HAY BALE LIFTING AND TRANSPORT APPARATUS

(71) Applicant: Graham Johnson, Henrietta, TX (US)

(72) Inventor: Graham Johnson, Henrietta, TX (US)

( * ) Notice: Subject to any disclaimer, the term of this patent is extended or adjusted under 35 U.S.C. 154(b) by 0 days.

(21) Appl. No.: 17/557,866

(22) Filed: Dec. 21, 2021

(51) Int. Cl.
  *A01D 90/08* (2006.01)
  *A01D 87/12* (2006.01)

(52) U.S. Cl.
  CPC ............ *A01D 90/08* (2013.01); *A01D 87/127* (2013.01)

(58) Field of Classification Search
  CPC .... A01D 90/08; A01D 87/127; B65H 75/425; B02C 21/02
  USPC ........................................ 414/24.5, 24.6, 111
  See application file for complete search history.

(56) References Cited

U.S. PATENT DOCUMENTS

| | | | | |
|---|---|---|---|---|
| 3,362,547 A * | 1/1968 | Kovarik | ..................... | B60P 1/44 414/556 |
| 3,820,673 A * | 6/1974 | McVaugh | ............... | B60P 3/035 414/501 |
| 4,042,140 A * | 8/1977 | McFarland | .......... | A01D 90/083 414/679 |
| 4,090,616 A | 5/1978 | Runyan et al. | | |
| 4,182,590 A * | 1/1980 | Harkness | ............. | A01D 90/083 414/501 |
| 4,228,967 A * | 10/1980 | Woodruff | ................. | B60P 3/035 242/399.1 |
| 4,253,786 A * | 3/1981 | Harkness | ............. | A01D 90/083 414/501 |
| 4,302,139 A | 11/1981 | Malish | | |
| 4,318,653 A | 3/1982 | Benefield et al. | | |
| 4,412,768 A | 11/1983 | Bauer et al. | | |
| 4,579,497 A * | 4/1986 | Nine | ..................... | A01D 87/127 414/24.5 |
| 4,674,933 A * | 6/1987 | Brown | ................. | A01D 87/127 224/567 |
| 5,584,637 A * | 12/1996 | Jensen, Sr. | ........... | A01D 87/127 414/24.5 |
| 5,676,513 A | 10/1997 | Bingham | | |
| 6,840,730 B2 | 1/2005 | Noualy | | |
| 8,585,342 B2 | 11/2013 | Smith | | |
| 8,764,369 B2 | 7/2014 | Browne | | |
| 2005/0008461 A1* | 1/2005 | Herdrich | ................. | B60P 3/035 414/24.5 |
| 2007/0166138 A1 | 7/2007 | Brooks | | |

(Continued)

*Primary Examiner* — Gregory W Adams
(74) *Attorney, Agent, or Firm* — Whitaker Chalk Swindle & Schwartz PLLC; Charles Gunter (57) ABSTRACT

A hay bale lifting and transport device is mounted on a transport vehicle having a cab and having a rear bed area located behind the cab which defines a generally rectangular shaped, exposed top planar surface. The lifting apparatus includes a pair of elongate hay bale spikes affixed to a mounting assembly so that the spikes are spaced apart a fixed distance and are arranged in a plane parallel to one another. The spikes and mounting assembly are received in an opening formed in the rear planar bed of the transport vehicle when the spikes are in a first, fully retracted position, the central axis of each of the spikes being located below the plane of the rear bed. An actuating mechanism acts upon the mounting assembly for moving the pair of spikes around a pivot axis between the fully retracted position and an extended position in which the spikes are arranged to engage a bale of hay.

6 Claims, 6 Drawing Sheets

(56) References Cited

U.S. PATENT DOCUMENTS

2010/0221092 A1 9/2010 Currie
2011/0293393 A1 12/2011 Nuxoll

* cited by examiner

HAY BALE LIFTING AND TRANSPORT APPARATUS

BACKGROUND OF THE INVENTION

1. Field of the Invention

The present invention relates generally to farm and ranch equipment and, more specifically, to an apparatus for lifting and transporting a bale of hay.

2. Description of the Prior Art

Traditionally, hay has been harvested by cutting the hay and permitting it to dry at least to a limited extent, forming it into windrows. The hay was then collected by forming it into separate rectangular bales tied by wire or twine. In more recent years, formation of the windrows into roll-type bales has become popular. The bales are formed into spiral rolls and bound together with twine or a plastic sheet wrapped around the circumference of the bale. These large roll type bales reduce the field time previously required to produce smaller bales, and the amount of handling for the individual, smaller bales.

However, it is not uncommon for roll type bales of this type to weigh as much as 1200 to 2000 pounds, or more. These bales are commonly stored in the field for drying but are typically removed from the field before the next cutting. Because of their considerable weight and size, round, roll type bales cannot be handled manually. Power lifting equipment is necessary for lifting, hauling and off-loading the bales.

Tractors equipped with hydraulic forklifts are available to move the bales to a storage location or to neighboring grazing fields to feed livestock. Hydraulic equipment has also been attached to pickup trucks to haul round hay bales. Specialized hay lifting and transport vehicles are also known in the art of hay movement and baling. Certain of these designs include outrigger type arms which pivot outwardly from the sides of the transport vehicle in use. While these designs work very well for their intended purpose, one limitation of such designs is the expense and complexity of this equipment.

U.S. Pat. No. 5,542,803, issued Aug. 6, 1996, to Driggs, shows a bale picker and stacker which includes control cab on a primary frame. The control cab and a steering controller are mounted to the primary frame for movement between a forward position at the frame front end and a rearward position outwardly along side the frame and adjacent the rearward frame end. A lifting bed on the primary frame includes a top bale receiving surface moves between substantially horizontal and vertical positions. A bale pick-up on the lifting bed, includes a leg section and an outwardly projecting platform section. The components of this bale picker extend from the rear of the truck platform and also comprise obstructions in the platform bed itself.

U.S. Patent Publication No. 2010/0221092, filed Nov. 19, 2009, by Currie, shows another apparatus for lifting and transporting a hay bale. The apparatus may include a hitch attachment for insertion into a receiver attached to a truck. The hitch attachment is coupled to an attachment slide which may be adjusted to match the height of the truck bed. The attachment slide is coupled to a bale spike which may be pivoted from a horizontal position to a vertical position. The attachment slide is coupled to a fifth wheel slide and coupler support, which is coupled to a fifth wheel ball hitch or other attachment point. A hydraulic cylinder or other power transfer means is attached at one end to the fifth wheel slide, and at the other end to the bale spike. A power source energizes a hydraulic pump to actuate the hydraulic cylinder. This reference it typical of those bale lifter designs which are temporarily affixed to, for example, a pickup truck bed, but which can be removed after use. One disadvantage of designs of this type is the time and effort involved in installing and removing the device for each use. Also, the components of the device cannot be retracted from an otherwise obtrusive position in the truck bed while the apparatus is installed on the truck.

U.S. Pat. No. 4,090,616, issued May 23, 1978, to Runyan, et al. shows another hay hauling device which is mounted in a vehicle bed to load, carry, and unload large hay bales. A rugged frame of the device is securely held in the vehicle bed by brackets which release the frame in selective fashion to permit its removal. A horizontal support member which is pivoted to the frame carries a central spear which is adapted to penetrate a bale resting on the ground. The spear is secured to a small sleeve which is slidably mounted on an upright post so that the elevation of the spear can be adjusted in order to accommodate bales of various sizes and vehicle beds of different heights. Because of the placement of the component parts of the device, the truck bed would be unavailable for most other types of chores while the apparatus is mounted in the truck bed.

The above references are not intended to represent an exhaustive review of the art of bale lifters, but are merely representative of two types known in the art. The present invention is directed towards improvements in the art of hale bale lifters and transports of this same general type, which invention overcomes certain of the deficiencies of the prior art as has been described above.

Thus, despite various improvements in the art of hay bale lifters, a need continues to exist for such a device which is cost-effective, easy to manufacture and easy to use in the field and which is dependable in operation.

A need also exists for such a device which can be fitted to a flat bed truck, but which can be actuated between an extended position in use and a retracted position for storage in which the operative components of the device do not otherwise obstruct the truck bed in the retracted position.

SUMMARY OF THE INVENTION

An apparatus according to the invention is provided for lifting and transporting a hay bale when mounted on a transport vehicle having a cab and having a rear bed area located behind the cab which defines a generally rectangular shaped, exposed top planar surface. The apparatus includes a pair of elongate hay bale spikes, each having a pointed end and an opposite connecting end defining a given length along a central axis. The connecting ends are affixed to a mounting assembly so that the spikes are spaced apart a fixed distance and are arranged in a plane parallel to one another.

The pair of spikes and associated mounting assembly are received in an opening formed in the rear planar bed of the transport vehicle when the spikes are in a first, fully retracted position, the central axis of each of the spikes being located below the plane of the rear bed, so that the bed can be used for other purposes, such as transporting other cargo.

An actuating mechanism is operatively connected to the mounting assembly for moving the pair of spikes around a pivot axis between the fully retracted position and an extended position in which the spikes are arranged to engage a bale of hay. The actuating mechanism can be a hydraulically operated mechanism which can be selectively engaged by an operator to move the spikes from their retracted position to a range of extended positions.

Preferably, at least one hydraulic cylinder is mounted in the rear bed area adjacent one of the spikes and generally parallel to the pair of spikes when the spikes are in the fully retracted position. The hydraulic cylinder is operatively connected to the mounting assembly through a pivot assembly, whereby actuating the hydraulic cylinder causes the mounting assembly to pivot about a pivot point and move the spikes between the fully retracted position and an extended position in which the spikes are arranged to engage a bale of hay.

Most preferably, a pair of hydraulic cylinders are mounted in the rear bed area of the truck, each of the hydraulic cylinders being operatively connected to the mounting assembly through a pivot assembly.

In one preferred version of the invention, the mounting assembly is pivotally mounted on a round bar which is welded between two vertical frame members located in the opening of the rear bed of the truck. Each of the hydraulic cylinders has an output shaft which is connected by a pair of pivot links to the mounting assembly, whereby actuating the hydraulic cylinders causes the respective output shafts to be extended and retracted, thereby causing the mounting assembly to rotate about the round bar and, in turn, the spikes to move between the retracted position and the extended positions.

In this way, the spikes are movable between a range of intermediate positions between a fully retracted and a fully extended position, depending upon the position of the output shafts of the hydraulic cylinders.

The improved apparatus of the invention can be used for lifting and transporting a bale of hay from one location to another. The transport vehicle, such as a utility truck equipped with the apparatus of the invention is typically driven to a field in which a bale of hay is located with the spikes in the fully retracted position. Actuating the actuating mechanism causes the spikes to move from the retracted position to a desired extended position. A bale of hay can then be engaged with the spikes. The engaged bale of hay can then be lifted and, if desired, moved to another location.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 1:
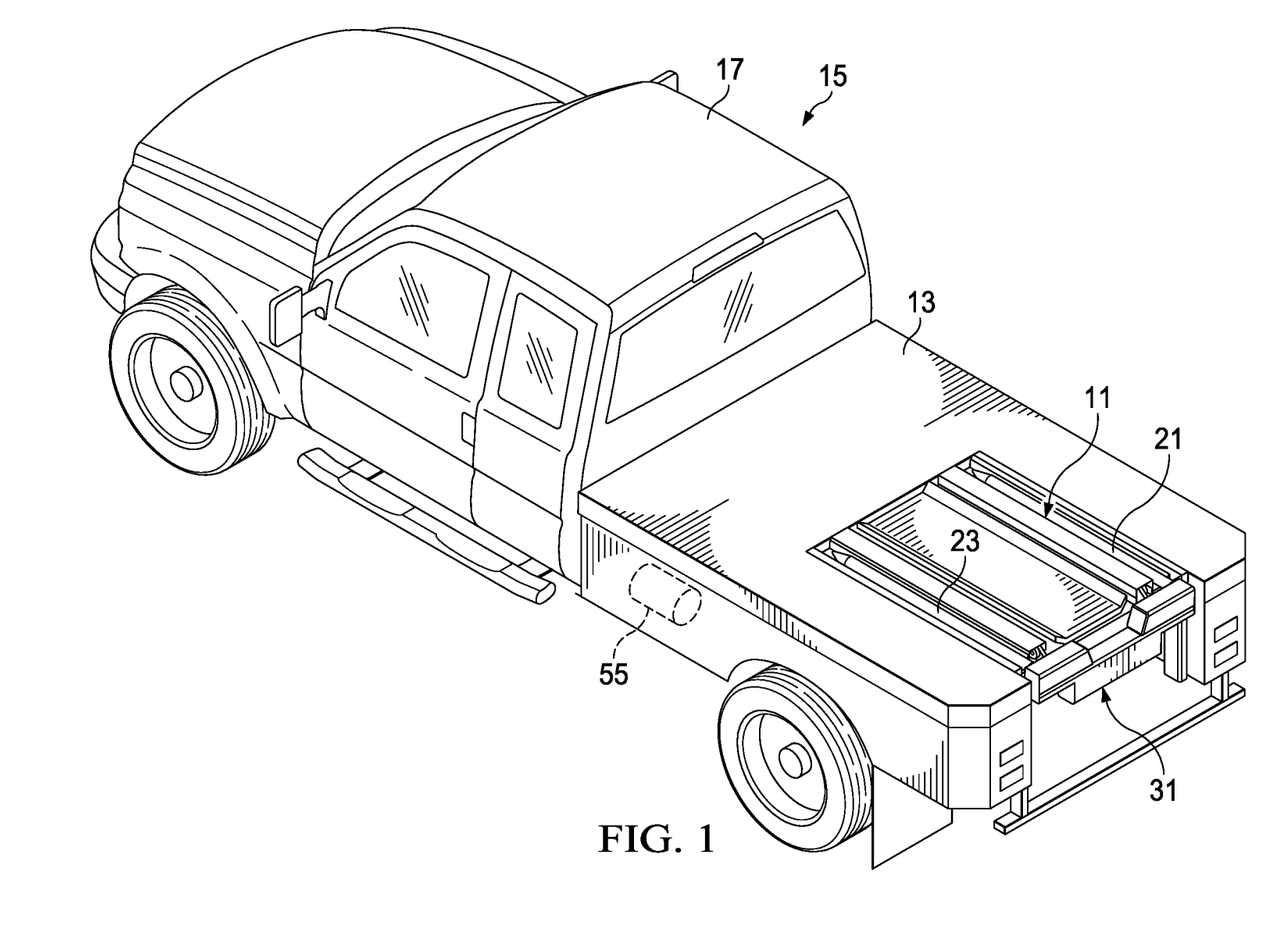
FIG. 1 is a perspective view of the hay bale lifting and loading apparatus of the invention installed within the bed of a flatbed utility truck.

Turning first to FIG. 1, there is shown a hay bale lifting and transport apparatus of the invention, designated generally as 11. The apparatus 11 is shown in one preferred form installed within the flat bed 13 of a transport vehicle 15 having a cab 17, with the rear bed area located behind the cab 17 defining a generally rectangular shaped, exposed top planar surface 13.

The transport vehicle shown in FIG. 1 is a conventional flatbed pickup. The bodywork of a flatbed truck, as the name suggests, is just an entirely flat, level 'bed' which typically has no sides or roof which is designed to haul machinery and heavy materials, often for commercial use. They are built to carry several tons of material at once. The platform does not typically have any storage compartments on it. This allows for quick and easy loading of goods, and consequently they are used to transport heavy loads that are not delicate or vulnerable to rain, and also for abnormal loads that require more space than is available on a closed body. The loads are generally retained by being manually tied down with ropes, or the like. A number of different model flatbed trucks are in commercial use today, many being adapted for specialized cargoes, such as for various agricultural uses, constructional steelwork or lighter abnormal loads, such as machinery, lumber loads/dry wall or any load that requires use of a forklift without the use of a loading dock.

While the invention will be described with respect to the flatbed truck shown in FIG. 1, it will be understood that other types of transport vehicles and support platforms for the mechanism of the invention could be utilized as well, such as a utility trailer pulled behind a truck or tractor. However, the apparatus of the invention is especially well adapted for use with a flatbed truck. The apparatus of the invention, as will be further described, can be adapted to the flat bed of a traditional flatbed pickup but does not constitute any particular encumbrance or obstacle as far as the available space on the flat bed, or its use for other purposes when not baling hay.

Figure 2:
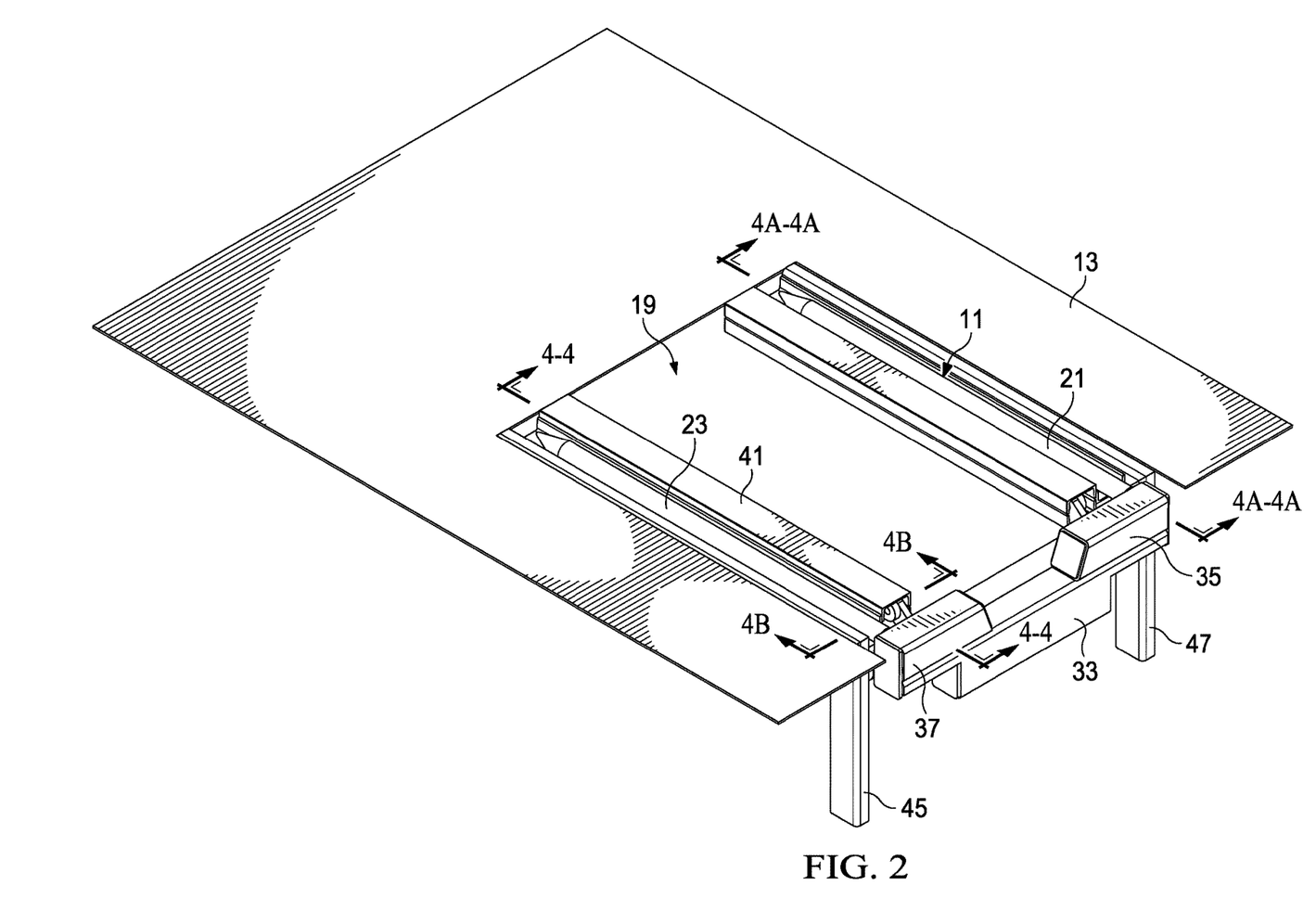
FIG. 2 is a close-up, isolated view of the apparatus of the invention shown in the retracted position with respect to the plane of the surrounding bed.

The flat bed 13 shown in FIGS. 1 and 2 has, in this case, a large rectangular opening (designated as 19 in FIG. 2). This is primarily for convenience. The apparatus of the invention could, as easily, be installed in two parallel and spaced-apart channels cut in the flat bed 13.

Figure 3:
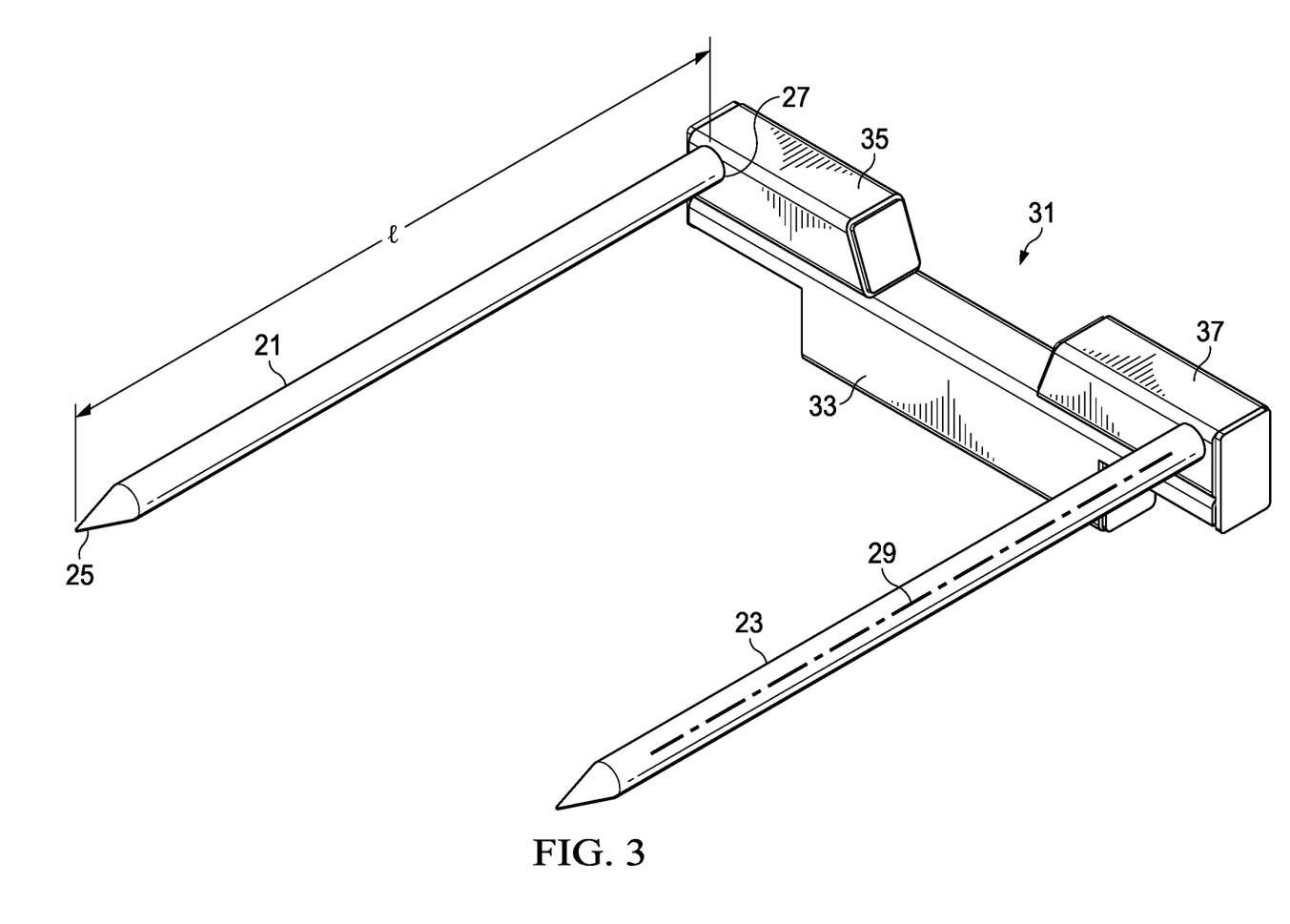
FIG. 3 is an isolated view of certain of the component parts of the apparatus of the invention, showing the hay baler spikes used to engage a bale of hay.

To now describe the apparatus in greater detail, FIG. 2 shows the principal components of the apparatus 11 in the fully retracted position with the apparatus being shown in isolated fashion within an opening 19 provided in the flat bed 13. FIG. 3 shows the hay bale engaging components of the apparatus in isolated fashion. These components include a pair of elongate hay bale spikes 21, 23, each having a pointed end 25 and an opposite connecting end 27 defining a given length "1" along a central axis (shown as 29 in FIGS. 3 and 4). As shown in FIG. 3, the connecting ends 27 are affixed to a mounting assembly 31 so that the spikes 21,23, are spaced apart a fixed distance and are arranged in a plane parallel to one another.

The pair of spikes 21, 23, and associated mounting assembly 31 shown in FIG. 3 are received in the elongated opening 19 formed in the rear planar bed 13 of the transport vehicle (as shown in FIGS. 1 and 2) when the spikes 21, 23, are in a first, fully retracted position (shown in FIGS. 1 and 2). It is important to note that the central axis 29 of each of the spikes 21, 23, is located either entirely or predominantly below the plane of the rear bed 13 (perhaps best shown in FIG. 4). This ensures that the spikes 21, 23, are not in the way of any other use being made of the flat bed 13 itself, as when hay is not being lifted or hauled. The operative components of the assembly are completely locked away, below the plane of the surrounding flat bed 13 in the most preferred embodiment of the invention.

Returning briefly to FIG. 2, the mounting assembly can assume various forms, but in this case is comprises of a rectangular tube 33 approximately 6×4×¼ inches in size. The rectangular tube 33 supports a pair of connector tubes 35, 37, each of which is a square tube approximately 4×4×¼ inches. The spikes 21, 23, are, in this case, round steel bar stock 2 inches in diameter and of any particular desired length. FIG. 2 shows the operative components of FIG. 2 in place within the opening 19 of the flatbed truck.

Figure 4:
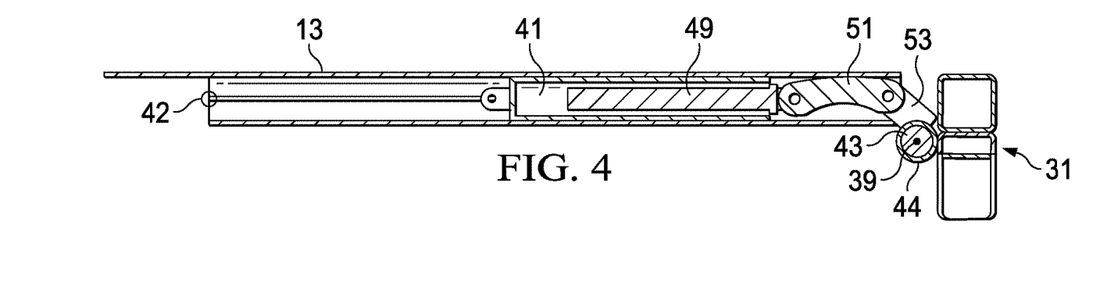
FIG. 4 is a side, partial cross sectional view taken along lines 4-4 in FIG. 2 with the hydraulic cylinders associated with the hay baler spikes in the fully retracted position.
Figures 4A, 4B:
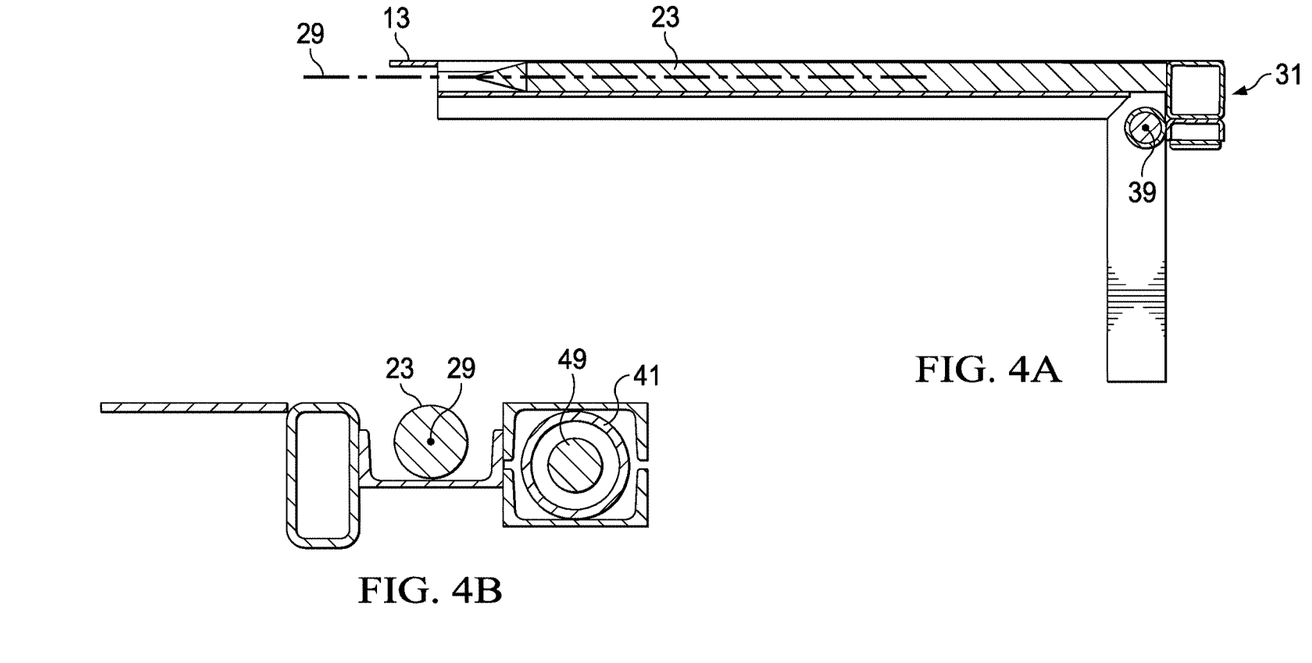
FIG. 4A is another partial cross sectional view taken along lines 4A-4A in FIG. 2.
FIG. 4B is another partial cross sectional view taken along lines 4B-4B in FIG. 2.

FIGS. 4, 4A and 4B are partial cross sectional views taken generally along the lines 4-4, 4A-4A and 4B-4B shown in FIG. 2. These figures show one form of the actuating mechanism which is operatively connected to the mounting assembly 31 for moving the pair of spikes 21, 23, around a pivot axis (shown as 39 in FIGS. 4 and 4A) between the fully retracted position (shown in FIGS. 1, 2 and 4) and a fully extended position (shown in FIG. 6A) in which the spikes are arranged to engage a bale of hay. As will be appreciated from FIG. 5A, the spikes are actually capable of being moved through a range of intermediate angular positions between the fully retracted and fully extended positions.

As can be seen in FIGS. 2 and 4, at least one hydraulic cylinder 41 (shown covered in FIG. 2) is mounted in the rear bed area of the truck adjacent one of the spikes 23, generally parallel to the pair of spikes 21, 23, when the spikes are in the fully retracted position. The hydraulic cylinder 41 is operatively connected to the mounting assembly 31 through a pivot assembly, whereby actuating the hydraulic cylinder 41 causes the mounting assembly to pivot about the pivot point 39 and move the spikes 21, 23, between the fully retracted position and an extended position in which the spikes are arranged to engage a bale of hay. Preferably, as shown in FIGS. 1 and 2, there are a pair of identical hydraulic cylinders used to actuate the assembly.

With further reference to FIG. 4, it can be seen that the mounting assembly 31 is pivotally mounted on a round bar (43 in FIG. 4), carried in a tube 44 which is welded between two vertical frame members (45, 47 in FIG. 2) located in the rear bed of the truck. Each of the hydraulic cylinders 41 is fixed at one end point (42 in FIG. 4) and has an output shaft 49 which is connected by a pair of pivot links 51, 53, to the mounting assembly, whereby actuating the hydraulic cylinders causes the respective output shafts to be extended and retracted, thereby causing the mounting assembly to rotate about the round bar 43 and, in turn, the spikes 21, 23, to move between the retracted position and the extended position.

The mounting assembly could also assume the form of a simple elongated cylinder to which the spikes would be welded at each of two opposing ends thereof. The cylinder would be received on the round bar 43 and be rotatable around the same pivot point axis 39, as has been described.

Although an elongate cylinder rotating about the round bar 43 would be a simple and economical pivot arrangement, more complicated designs could be utilized, as well. For example, to decrease the friction between the mounting assembly and the round bar 43, an axle bearing assembly could be mounted at either end of the mounting assembly to facilitate the movement of the mounting assembly about the round bar 43 or other components of the pivot mechanism.

FIG. 4B is another partial cross sectional view which shows an end view of the hydraulic cylinder 41 with its output shaft 49 showing the parallel arrangement of the hydraulic cylinder and the central axis 29 of the hay spike 23.

Figures 5, 5A:
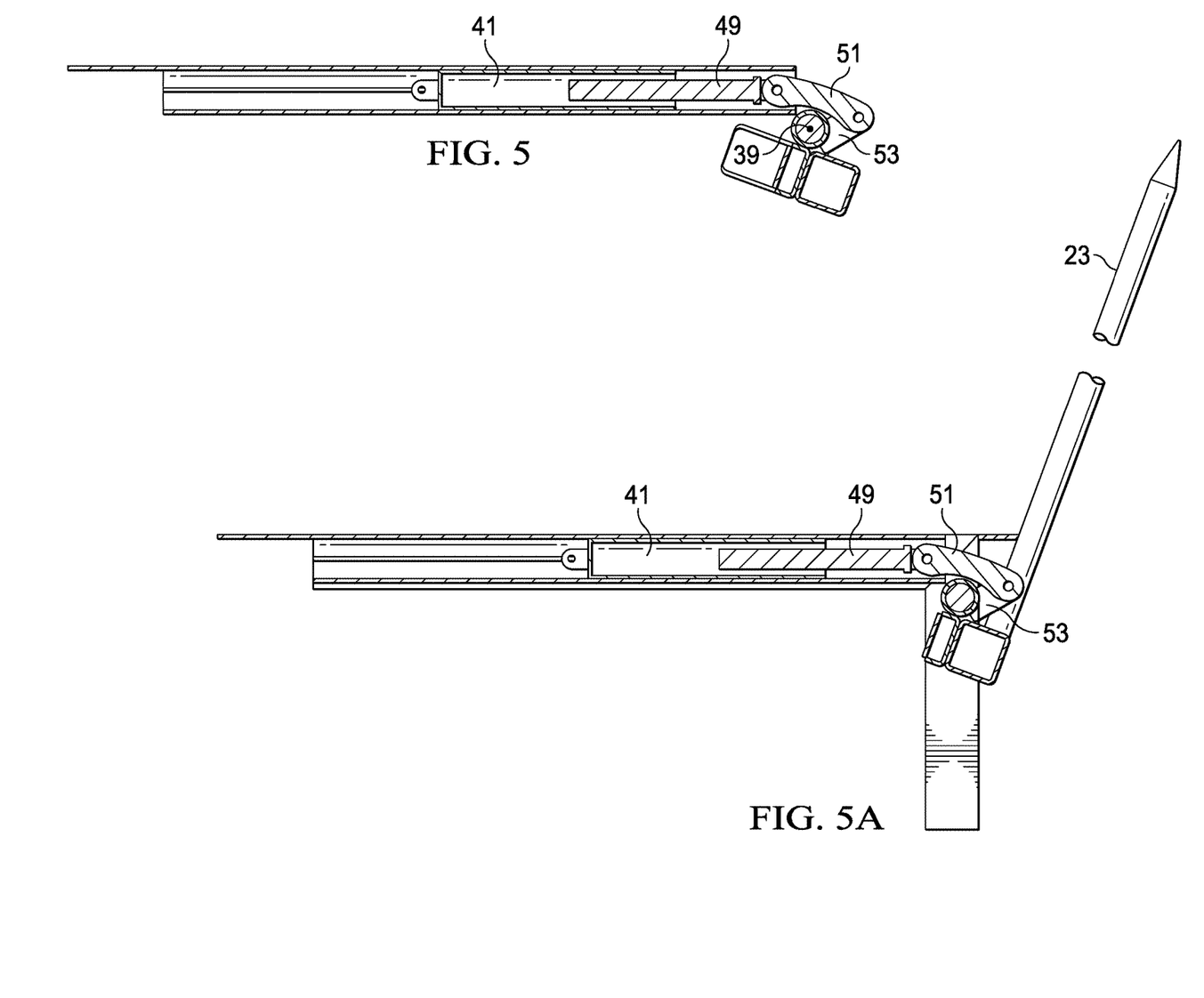
FIG. 5 is a view similar to FIG. 4, but showing the hydraulic cylinders used to actuate the hay baler spikes extended approximately 6 inches.
FIG. 5A is a view similar to FIG. 4A, taken at the same cross sectional position, but showing the partially extended spikes.

FIGS. 5 and 5A are partial sectional views, similar to FIGS. 4 and 4A, but showing the hay spike 23 in a partially extended, intermediate position. It can be seen that the output shaft 49 of the hydraulic cylinder 41 is partly extended and has moved the pivot links 51, 53 from the position shown in FIG. 4 to the position shown in FIG. 5. The intermediate position of FIGS. 5 and 5A might also represent the transport position of the apparatus when a lifted hay bale is being transported.

Figure 6:
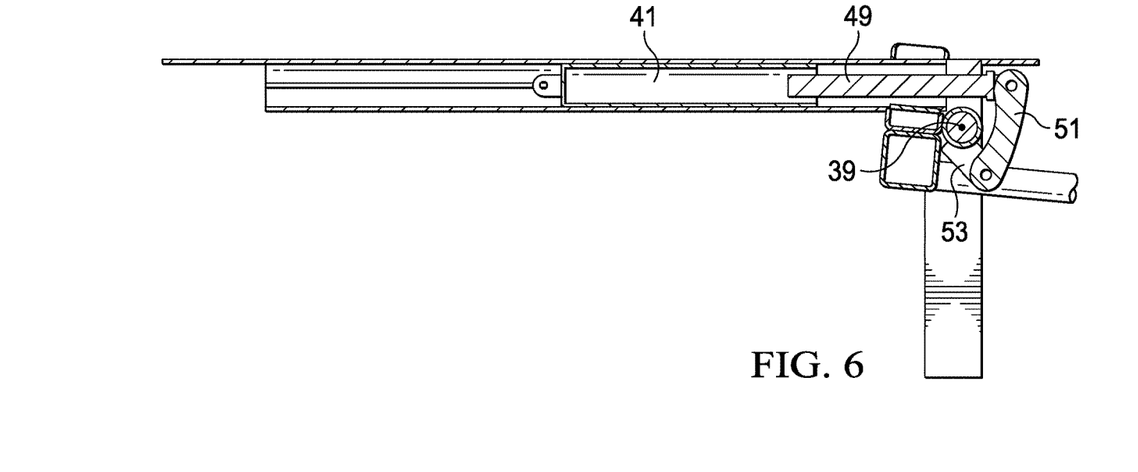
FIG. 6 is a view similar to FIG. 5, but showing the hydraulic cylinders used to actuate the hay baler spikes fully extended.
Figure 6A:
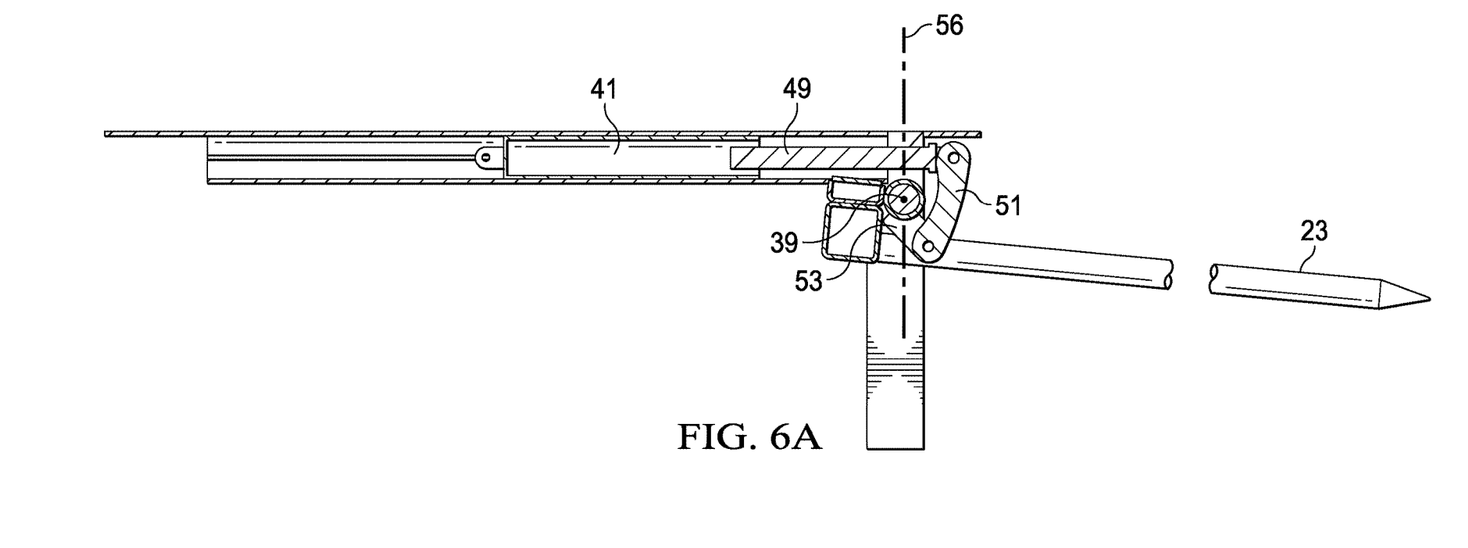
FIG. 6A is another partial cross sectional view, similar to FIG. 5A, but showing the hay baler spikes in the fully extended position.

FIGS. 6 and 6A are another set of partial sectional views, similar to FIGS. 5 and 5A, but showing the hay bale spike 23 in the fully extended position, ready to engage a bale of hay.

The hydraulic cylinders 41 can be powered in conventional fashion. For example, a hydraulic pump (shown in simplified fashion as 55 in FIG. 1) can be mounted on the truck body and communicates hydraulically with the cylinders 41. The hydraulic pump 41 can be powered by a 12-volt battery and controlled in any convenient fashion, as by a hand-held switch (not shown). The hydraulic pump 55 could also be mounted in a utility box, which may also be used to store the hand-held switch, wires and hydraulic lines when the bale lifting apparatus is not being used.

When the bale lifting apparatus 11 is assembled and installed on a pickup truck 15, it may be used by an individual to haul a bale of hay. Typically, the individual will drive the pickup truck 15 to the location of the bale of hay. The individual will then lower the bale spikes 21, 23, so that the spikes 21, 23 are in the fully extended position shown in FIG. 6A, at about a 120 degree angle about the vertical axis of rotation (shown as 56 in FIG. 6A). The truck 15 is then put in reverse to back the truck up until the spikes 21, 23, pierce the bale of hay.

Once the spikes 21, 23, are in the bale of hay, the driver may operate the hand control to raise the bale. The hydraulic pump 55 responds by directing hydraulic fluid to the appropriate port of the hydraulic cylinders 41. The hydraulic cylinders 41 respond by pulling on the pivot links 51, 53, causing them to move in the opposite manner than previously described, to lift the bale of hay for transport.

An invention has been provided with several advantages. The lifting and transport mechanism of the invention is simple in design and economical to manufacture. It can easily be adapted to a commercial style flatbed utility truck. When not in use, the hay bale engaging spikes are fully retracted to a storage position within the flat bed of the transport vehicle where they are out of the way of other uses of the truck bed. The hay bale spikes are actuated hydraulically, whereby the spikes move from the retracted position to one or more extended position, as controlled by an operator. It is not necessary to take the time or effort to install an apparatus immediately prior to use, as was the case in the past, where it was necessary to install the spikes into spike receiving holes on the transport truck. In wintertime weather, these holes sometimes cover over with ice and snow, making installation of the removable spikes a difficult chore.

While the invention has been shown in only one of its forms, it is not thus limited but is susceptible to various changes and modifications without departing from the spirit thereof.

What is claimed is:

1. An apparatus for lifting and transporting a hay bale when mounted on a transport vehicle having a cab and having a rear bed area located behind the cab which defines a generally rectangular shaped, exposed top planar surface, the apparatus comprising:
a pair of elongate hay bale spikes, each having a pointed end and an opposite connecting end defining a given length along a central axis, the connecting ends being affixed to a mounting assembly so that the spikes are spaced apart a fixed distance and are arranged in a plane parallel to one another;
wherein each of the pair of spikes and associated mounting assembly are received in an opening formed in the rear planar bed of the transport vehicle when the spikes are in a first, fully retracted position, the central axis of each of the spikes being located below the plane of the rear bed;
a pair of hydraulic cylinders mounted in the rear bed area, each of the pair of hydraulic cylinders being mounted adjacent one of the spikes and generally parallel to the pair of spikes when the spikes are in the fully retracted position, the hydraulic cylinders being operatively connected to the mounting assembly through a pivot assembly, whereby actuating the hydraulic cylinders causes the mounting assembly to pivot about a pivot point and move the spikes between the fully retracted position and an extended position in which the spikes are arranged to engage a bale of hay;
wherein the mounting assembly is pivotally mounted on a round bar which is welded between two vertical frame members located in the opening of the rear bed of the truck, each of the hydraulic cylinders having an output shaft which is connected by a pair of pivot links to the mounting assembly, whereby actuating the hydraulic cylinders causes the respective output shafts to be extended and retracted, thereby causing the mounting assembly to rotate about the round bar and, in turn, the spikes to move between the retracted position and the extended position.

2. The apparatus of claim 1, wherein the spikes are movable between a range of intermediate positions between a fully retracted and a fully extended position, depending upon the position of the output shafts of the hydraulic cylinders.

3. A method of lifting and transporting a bale of hay using an apparatus mounted on a transport vehicle having a cab and having a rear bed area located behind the cab which defines a generally rectangular shaped, exposed top planar surface, the method comprising the steps of:
providing a pair of elongate hay bale spikes, each having a pointed end and an opposite connecting end defining a given length along a central axis, the connecting ends being affixed to a mounting assembly so that the spikes are spaced apart a fixed distance and are arranged in a plane parallel to one another;
locating the pair of spikes and associated mounting assembly within an opening formed in the rear planar bed of the transport vehicle, the spikes being located within the opening in a position so that, in a first, fully retracted position, the central axis of each of the spikes being located below the plane of the rear bed;
providing an actuating mechanism operatively connected to the mounting assembly for moving the pair of spikes around a pivot axis between the fully retracted position and an extended position in which the spikes are arranged to engage a bale of hay;
driving the transport vehicle to a field in which a bale of hay is located;
actuating the actuating mechanism to move the spikes from the retracted position to the extended position;
engaging a bale of hay with the spikes;
actuating the actuating mechanism again to move the spikes from the fully extended position to an intermediate position in which the bale of hay is in a lifted position;
transporting the lifted bale of hay to a different location;
wherein the actuating mechanism comprises a pair of hydraulic cylinders which are mounted in the rear bed area, each being adjacent one of the spikes and generally parallel to the pair of spikes when the spikes are in the fully retracted position, each of the hydraulic cylinders being operatively connected to the mounting assembly through a pivot assembly, whereby actuating the hydraulic cylinders causes the mounting assembly to pivot about a pivot point and move the spikes between the fully retracted position and an extended position in which the spikes are arranged to engage a bale of hay; and
wherein the mounting assembly is pivotally mounted on a round bar which is welded between two vertical frame members located in the opening of the rear bed of the truck, each of the hydraulic cylinders having an output shaft which is connected by a pair of pivot links to the mounting assembly, whereby actuating the hydraulic cylinders causes the respective output shafts to be extended and retracted, thereby causing the mounting assembly to rotate about the round bar and, in turn, the spikes to move between the retracted position and the extended position.

4. The method of claim 3, wherein the spikes are movable between a range of intermediate positions between a fully retracted and a fully extended position, depending upon the position of the output shafts of the hydraulic cylinders.

5. An apparatus for piercing, lifting and transporting a hay bale when mounted on a transport vehicle having a cab and having a rear bed area located behind the cab which defines a generally rectangular shaped, exposed top planar surface, the apparatus comprising:
a pair of elongate hay bale spikes, each having a pointed end and an opposite connecting end defining a given length along a central axis, the connecting ends being affixed to a mounting assembly so that the spikes are spaced apart a fixed distance and are arranged in a plane parallel to one another;

wherein each of the pair of spikes and associated mounting assembly are received in an opening formed in the rear planar bed of the transport vehicle when the spikes are in a first, fully retracted position, the central axis of each of the spikes being located below the plane of the rear bed;

a pair of hydraulic cylinders mounted in the rear bed area, each of the pair of hydraulic cylinders being mounted adjacent one of the spikes and generally parallel to the pair of spikes when the spikes are in the fully retracted position, the hydraulic cylinders being operatively connected to the mounting assembly through a pivot assembly, whereby actuating the hydraulic cylinders causes the mounting assembly to pivot about a pivot point and move the spikes between the fully retracted position and an extended position in which the spikes are arranged to engage a bale of hay;

wherein the mounting assembly is pivotally mounted between two vertical frame members located in the opening of the rear bed of the truck, each of the hydraulic cylinders having an output shaft which is connected by a pivot link to the mounting assembly, whereby actuating the hydraulic cylinders causes the respective output shafts to be extended and retracted entirely in the same parallel plane as the pair of spikes in the retracted position, thereby causing the mounting assembly to rotate and, in turn, the spikes to move between the retracted position and the extended position.

6. An apparatus for piercing, lifting and transporting a hay bale when mounted on a transport vehicle having a cab and having a rear bed area located behind the cab which defines a generally rectangular shaped, exposed top planar surface, the apparatus comprising:

a pair of elongate hay bale spikes, each having a pointed end and an opposite connecting end defining a given length along a central axis, the connecting ends being affixed to a mounting assembly so that the spikes are spaced apart a fixed distance and are arranged in a plane parallel to one another;

wherein each of the pair of spikes and associated mounting assembly are received in an opening formed in the rear planar bed of the transport vehicle when the spikes are in a first, fully retracted position, the central axis of each of the spikes being located below the plane of the rear bed;

at least one hydraulic cylinder mounted in the rear bed area adjacent the spikes and generally parallel to the pair of spikes when the spikes are in the fully retracted position, the hydraulic cylinder being operatively connected to the mounting assembly through a pivot assembly, whereby actuating the hydraulic cylinder causes the mounting assembly to pivot about a pivot point and move the spikes between the fully retracted position and an extended position in which the spikes are arranged to engage a bale of hay;

wherein the mounting assembly is pivotally mounted between two vertical frame members located in the opening of the rear bed of the truck, the at least one hydraulic cylinder having an output shaft which is connected by a pivot links to the mounting assembly, whereby actuating the hydraulic cylinder causes the respective output shaft to be extended and retracted entirely in the same parallel plane as the pair of spikes in the retracted position, thereby causing the mounting assembly to rotate and, in turn, the spikes to move between the retracted position and the extended position.

\* \* \* \* \*